US008561183B2

(12) United States Patent
Muth et al.

(10) Patent No.: US 8,561,183 B2
(45) Date of Patent: Oct. 15, 2013

(54) NATIVE CODE MODULE SECURITY FOR ARM INSTRUCTION SET ARCHITECTURES

(75) Inventors: Robert Muth, New York, NY (US); Karl Schmipf, Santa Cruz, CA (US); David C. Sehr, Cupertino, CA (US); Clifford L. Biffle, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1001 days.

(21) Appl. No.: 12/621,286

(22) Filed: Nov. 18, 2009

(65) Prior Publication Data

US 2011/0029961 A1 Feb. 3, 2011

Related U.S. Application Data

(60) Provisional application No. 61/230,530, filed on Jul. 31, 2009.

(51) Int. Cl.
*G06F 11/00* (2006.01)

(52) U.S. Cl.
USPC ............... 726/22; 726/23; 726/27; 717/124; 717/126; 717/127; 717/154

(58) Field of Classification Search
None
See application file for complete search history.

(56) References Cited

U.S. PATENT DOCUMENTS

| | | | | |
|---|---|---|---|---|
| 5,815,695 | A * | 9/1998 | James et al. | 712/220 |
| 5,974,549 | A * | 10/1999 | Golan | 726/23 |
| 6,275,938 | B1 * | 8/2001 | Bond et al. | 726/23 |
| 7,020,772 | B2 * | 3/2006 | England et al. | 713/166 |
| 2002/0099952 | A1 * | 7/2002 | Lambert et al. | 713/200 |
| 2004/0230791 | A1 * | 11/2004 | Boebert et al. | 713/150 |
| 2004/0255097 | A1 * | 12/2004 | Seal et al. | 712/209 |
| 2005/0246453 | A1 * | 11/2005 | Erlingsson et al. | 710/1 |
| 2005/0246718 | A1 * | 11/2005 | Erlingsson et al. | 719/317 |
| 2006/0230454 | A1 * | 10/2006 | Achanta et al. | 726/24 |
| 2007/0220276 | A1 * | 9/2007 | Croxford et al. | 713/193 |
| 2008/0016339 | A1 * | 1/2008 | Shukla | 713/164 |
| 2009/0282474 | A1 | 11/2009 | Chen et al. | 726/21 |
| 2009/0282477 | A1 | 11/2009 | Chen et al. | 726/22 |
| 2011/0029820 | A1 | 2/2011 | Sehr et al. | 714/38.1 |

OTHER PUBLICATIONS

'Efficient Software-Based Fault Isolation' by Wahbe et al., Proceedings of the Symposium on Operating System Principles, 1993.*
'Software Fault Isolation: a first step towards Microreboot in legacy C applications' by Timothy Fraser, May 20, 2005.*
'Lightweight Module Isolation for Sensor Nodes' by Nirmal Weerasinghe et al., Workshop on Virtualization in Mobile Computing, 2008.*
Wikipedia article on 'ARM Architecture' from Jun. 1, 2009.*
'Efficient, Verifiable Binary Sandboxing for a CISC Architecture' by Stephen McCamant et al., Computer Science and Artificial Intelligence Laboratory Technical Report, MIT, May 2, 2005.*

* cited by examiner

*Primary Examiner* — Steven Snyder
(74) *Attorney, Agent, or Firm* — Fish & Richardson P.C.

(57) ABSTRACT

Some embodiments provide a system that executes a native code module. During operation, the system obtains the native code module. Next, the system loads the native code module into a secure runtime environment. Finally, the system safely executes the native code module in the secure runtime environment by using a set of software fault isolation (SFI) mechanisms that constrain store instructions in the native code module. The SFI mechanisms also maintain control flow integrity for the native code module by dividing a code region associated with the native code module into equally sized code blocks and data blocks and starting each of the data blocks with an illegal instruction.

25 Claims, 4 Drawing Sheets

NATIVE CODE MODULE SECURITY FOR ARM INSTRUCTION SET ARCHITECTURES

RELATED APPLICATION

This application hereby claims priority under 35 U.S.C. §119 to U.S. Provisional Application No. 61/230,530, entitled "Native Code Module Security for Arm Instruction Set Architectures," by Robert Muth, Karl Schmipf, and David C. Sehr, filed 31 Jul. 2009.

The subject matter of this application is related to the subject matter in a co-pending non-provisional application by J. Bradley Chen, Matthew T. Harren, Matthew Papakipos, David C. Sehr, and Bennet S. Yee, entitled "Method for Validating an Untrusted Native Code Module," having Ser. No. 12/117,634, and filing date 8 May 2008.

The subject matter of this application is also related to the subject matter in a co-pending non-provisional application by J. Bradley Chen, Matthew T. Harren, Matthew Papakipos, David C. Sehr, Bennet S. Yee, and Gregory Dardyk, entitled "Method for Safely Executing an Untrusted Native Code Module on a Computing Device," having Ser. No. 12/117,650, and filing date 8 May 2008.

The subject matter of this application is also related to the subject matter in a co-pending non-provisional application by David C. Sehr, Bennet Szebun Yee, John Bradley Chen, and Victor Khimenko and filed on the same day as the instant application, entitled "Native Code Module Security for 64-Bit Instruction Set Architectures, " having Ser. No. 12/621,266, and filing date Nov. 18, 2009.

BACKGROUND

1. Field

The present embodiments relate to techniques for safely executing native code modules. More specifically, the present embodiments relate to a method and system for safely executing native code modules within ARM instruction set architectures.

2. Related Art

Easy access to computers and plentiful network bandwidth have facilitated sharing of information and applications. For instance, a user of a computing device (e.g., personal computer, mobile phone, personal digital assistant, etc.) may easily install and execute an application downloaded from a web site or received from a friend as an email attachment. However, installing and executing such applications on a given computing device typically involves a level of trust that is granted on an all-or-nothing basis by the operating system of the computing device. Furthermore, bugs in the operating system may inadvertently allow applications to access resources As a result, some (e.g., native) applications may have full access to the operating system and/or resources of the computing device, while other (e.g., web) applications may have little to no direct access to the operating system and/or resources of the computing device.

Such coarse application of trust may negatively impact the execution of all applications on the computing device. For example, native applications may produce unwanted side effects by modifying files on the computing device and/or engaging in computation or communication outside of the tasks or features requested by the user. On the other hand, web applications may execute one to two orders of magnitude slower than native applications and may provide limited functionality to the user.

Hence, what is needed is a finer-grained application of trust to software executing on computing devices.

SUMMARY

Some embodiments provide a system that executes a native code module. During operation, the system obtains the native code module. Next, the system loads the native code module into a secure runtime environment. Finally, the system safely executes the native code module in the secure runtime environment by using a set of software fault isolation (SFI) mechanisms that constrain store instructions in the native code module. The SFI mechanisms also maintain control flow integrity for the native code module by dividing a code region associated with the native code module into equally sized code blocks and data blocks and starting each of the data blocks with an illegal instruction.

In some embodiments, the secure runtime environment is for an ARM instruction set architecture.

In some embodiments, the system also validates the native code module using one or more of the SFI mechanisms prior to executing the native code module in the secure runtime environment.

In some embodiments, maintaining control flow integrity for the native code module further involves at least one of:
(i) restricting control flow instructions to branch-and-link instructions and branch-and-exchange instructions;
(ii) validating direct control flow instructions;
(iii) disabling Thumb instructions; and
(iv) masking destination addresses associated with indirect control flow instructions.

In some embodiments, masking destination addresses associated with indirect control flow instructions involves clearing a set of upper bits and a set of lower bits in each of the destination addresses.

In some embodiments, a transfer of control flow to the illegal instruction causes the native code module to discontinue execution.

In some embodiments, constraining store instructions in the native code module involves:
(i) bounding an address space and a call stack of the native code module with a set of unmapped pages;
(ii) enforcing storage of valid data addresses in a stack pointer;
(iii) computing a store address by combining a valid base register with an immediate offset; and
(iv) masking non-stack-relative store instructions.

In some embodiments, enforcing storage of valid data addresses in the stack pointer involves enabling store instructions that increment or decrement the stack pointer without masking and masking direct updates to the stack pointer to keep a value of the stack pointer within the call stack.

In some embodiments, the unmapped pages enable stack-relative store instructions without masking if the immediate offset is smaller than a size of one or more of the unmapped pages.

In some embodiments, the SFI mechanisms are configured to mask instructions in the native code module by:
(i) executing a mask instruction prior to executing each instruction from the instructions; and
(ii) storing an execution condition of the instruction in a condition code field of the mask instruction.

BRIEF DESCRIPTION OF THE FIGURES

In the figures, like reference numerals refer to the same figure elements.

DETAILED DESCRIPTION

Figure 1:
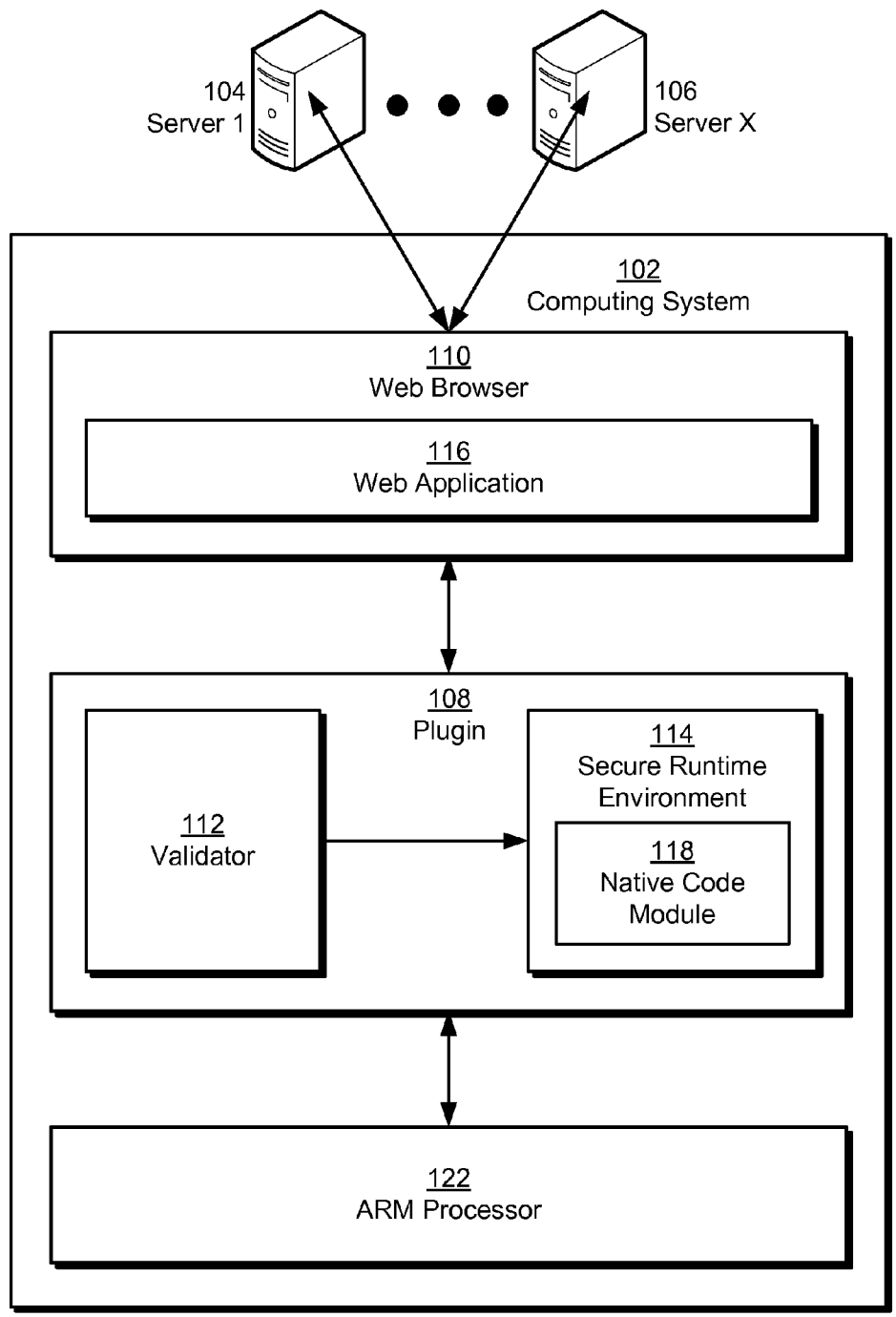
FIG. 1 shows a schematic of an embodiment of a system.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the system is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system.

The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments provide a method and system for safely executing a native code module. The native code module may contain native code that is executed within a secure runtime environment that isolates the native code module from sensitive data and resources on the computing system. The native code module may additionally be validated by a validator prior to execution within the secure runtime environment to ensure that the native code module complies with a set of security constraints. Furthermore, the native code module may be used to perform computationally intensive operations for a web application executing within a web browser.

More specifically, embodiments provide a method and system for maintaining security for the native code module within an ARM instruction set architecture (ISA). To maintain security, the validator and/or secure runtime environment may provide a set of software fault isolation (SFI) mechanisms that maintain control flow integrity and constrain store instructions in the native code module in lieu of x86 hardware memory segments. Control flow integrity may be maintained by dividing a code region associated with the native code module into equally sized code blocks and data blocks, starting the data blocks with illegal instructions, restricting control flow instructions to branch-and-link instructions and branch-and-exchange instructions, validating direct control flow instructions, disabling Thumb instructions, and/or masking destination addresses associated with indirect control flow instructions. Store instructions may be constrained by bounding an address space and a call stack of the native code module with a set of unmapped pages, enforcing storage of valid data addresses in a stack pointer, computing a store address by combining a valid base register with an immediate offset, and/or masking non-stack-relative store instructions. Consequently, embodiments may provide per-thread protection with low performance overhead during execution of native code modules while maintaining platform independence and portability across different web browsers and operating systems.

FIG. 1 shows a schematic of an exemplary system. This exemplary system includes a computing system 102 and a set of servers (e.g., server 1 104, server x 106). Computing system 102 includes a web application 116 running within a web browser 110, a plugin 108, and an ARM processor 122. Each of these components is described in further detail below.

Computing system 102 may correspond to an electronic device that provides one or more services or functions to a user. For example, computing system 102 may operate as a mobile phone, personal computer (PC), global positioning system (GPS) receiver, portable media player, personal digital assistant (PDA), and/or graphing calculator. In addition, computing system 102 may include an operating system (not shown) that coordinates the use of hardware and software resources on computing system 102, as well as one or more applications (e.g., web browser 110, web application 116) that perform specialized tasks for the user. For example, computing system 102 may include applications such as an email client, address book, document editor, web browser 110, and/or media player. To perform tasks for the user, applications may obtain the use of hardware resources (e.g., ARM processor 122, memory, I/O components, network interface card, graphics-processing unit (GPU), etc.) on computing system 102 from the operating system, as well as interact with the user through a hardware and/or software framework provided by the operating system, as described below.

In one or more embodiments, computing system 102 includes functionality to obtain and/or execute applications using a network connection. In particular, computing system 102 may obtain web application 116 from one or more servers (e.g., server 1 104, server x 106) using a network connection with the server(s) and load web application 116 in web browser 110. For example, web application 116 may be downloaded from an application server over the Internet by web browser 110.

Once loaded, web application 116 may provide features and user interactivity comparable to that of native applications on computing system 102. For example, web application 116 may function as an email client, document editor, media player, computer-aided design (CAD) system, and/or computer game. Web application 116 may also include dynamic user interface elements such as menus, buttons, windows, sub-windows, icons, animations, and/or other graphical objects that emulate analogous user interface elements in native applications. In other words, web application 116 may correspond to a rich Internet application (RIA).

Furthermore, web application 116 may execute on computing system 102 regardless of the type of platform (e.g., operating system, drivers, hardware, etc.) associated with computing system 102. Though platform-independent applications such as web application 116 may be more portable and secure than native applications, such cross-platform applications may lack certain performance capabilities of native applications.

More specifically, non-native applications such as web application 116 may be written using scripting languages that are interpreted rather than compiled, such as JavaScript (JavaScript™ is a registered trademark of Sun Microsystems, Inc.). The interpreted nature of web application 116 and/or other non-native applications may result in significantly slower execution times for the non-native applications than those of compiled native applications. Non-native applications may also be unable to utilize low-level libraries and/or application programming interfaces (API) that are available for use by native applications. Consequently, non-native applications may provide limited functionality in certain tasks.

To enable native performance for web applications, computing system 102 may obtain and execute a native code module 118 within plugin 108. Like web application 116, native code module 118 may be obtained from one or more servers (e.g., server 1 104, server x 106) by web browser 110. For example, web application 116 may provide a hyperlink to native code module 118 on the Internet. Web browser 110 may then download native code module 118 from the Uniform Resource Locator (URL) specified in the hyperlink. Alternatively, native code module 118 may be specified by the user or by an external source, such as another web application and/or a native application. Furthermore, native code module 118 may be obtained from local storage (e.g., a browser cache) on computing system 102 instead of from a server.

More specifically, native code module 118 may correspond to a software module containing native code that runs directly on hardware provided by computing system 102, such as a CPU (e.g., ARM processor 122). As a result, native code module 118 may be used to perform tasks that require substantial access to CPU resources on computing system 102. For example, native code module 118 may be used by web application 116 to provide computationally intensive features associated with physics simulation, signal processing, artificial intelligence, modeling, flexible high-throughput cryptography, and/or multimedia editing and analysis.

In one or more embodiments, plugin 108 includes a variety of mechanisms to ensure the safe execution of native code module 118. In particular, native code module 118 may be validated by a validator 112 provided by plugin 108 prior to execution. Native code module validation is described in a co-pending non-provisional application by inventors J. Bradley Chen, Matthew T. Harren, Matthew Papakipos, David C. Sehr, and Bennet S. Yee, entitled "Method for Validating an Untrusted Native Code Module," having Ser. No. 12/117,634, and filing date 8 May 2008, which is incorporated herein by reference.

Once native code module 118 is validated, native code module 118 may be loaded into a secure runtime environment 114 provided by plugin 108. Native code execution in a secure runtime environment is described in a co-pending non-provisional application by inventors J. Bradley Chen, Matthew T. Harren, Matthew Papakipos, David C. Sehr, Bennet S. Yee, and Gregory Dardyk, entitled "Method for Safely Executing an Untrusted Native Code Module on a Computing Device," having Ser. No. 12/117,650, and filing date 8 May 2008, which is incorporated herein by reference. Secure runtime environment 114 may also be provided by a web browser extension to web browser 110, and/or secure runtime environment 114 may be built into web browser 110.

Furthermore, because native code module 118 may include binary code that runs directly on hardware, native code module 118 may be platform-independent with respect to the operating system, web browser 110, and/or other software components on computing system 102. As described in the above-referenced applications, plugin 108 and/or native code module 118 may also include mechanisms for executing on a variety of instruction set architectures, including the use of "fat binaries" and binary translators.

However, native code module 118 may not be platform-independent with respect to the instruction set architecture (ISA) of one or more processors (e.g., ARM processor 122) in computing system 102. In particular, different ISAs may implement data types, instructions, registers, addressing modes, memory architecture, interrupt and exception handling, and/or external input/output (I/O) differently. Accordingly, instructions and mechanisms for executing software modules (e.g., web browser 110, native code module 118, plugin 108, etc.) directly on hardware may vary between different ISAs. Moreover, execution of the same software module within multiple ISAs may require that the software module be recompiled into a different binary executable for each ISA. For example, an x86 64-bit implementation of native code module 118 may utilize 64-bit addresses, a flat segmentation model of memory, and 64-bit general-purpose registers (GPRs), while an x86 implementation of native code module 118 may utilize 32-bit addresses, a multi-segment model of memory, and 32-bit GPRs.

Differences in ISA implementations may additionally affect security mechanisms used to validate and execute native code module 118. More specifically, the security mechanisms described in the above-referenced applications for executing native code modules within x86 ISAs may not pertain to mechanisms for safely executing native code modules within x86 64-bit or ARM ISAs. Consequently, the functionality of validator 112 and/or secure runtime environment 114 may require adaptation for use within a variety of ISAs.

In one or more embodiments, the system of FIG. 1 includes functionality to safely execute native code module 118 within an ARM ISA. In other words, plugin 108 and web browser 110 may correspond to software modules that execute directly on ARM processor 122 using the ARM ISA. Moreover, native code module 118 may correspond to a set of ARM instructions and data that is loaded into the address space of ARM processor 122 and used to facilitate the execution of web application 116.

As with native code modules in x86 environments, the secure execution of native code module 118 on ARM processor 122 may be facilitated by validator 112 and/or secure runtime environment 114. In particular, validator 112 and secure runtime environment 114 may enable safe execution of native code module 118 on ARM processor 122 using a set of software fault isolation (SFI) mechanisms in lieu of hardware segmented memory support available in x86 ISAs. Such SFI mechanisms may maintain control flow integrity for native code module 118 and/or constrain store instructions in native code module 118.

Validator 112 and secure runtime environment 114 may also be configured to maintain security for native code modules within x86 64-bit ISAs. Native code module security within x86 64-bit ISAs is described in a co-pending non-provisional application by David C. Sehr, Bennet S. Yee, J. Bradley Chen, and Victor Khimenko and filed on the same day as the instant application, entitled "Native Code Module Security for 64-bit Instruction Set Architectures," having Ser. No. 12/621 266, and filing date Nov. 18, 2009, which is incorporated herein by reference.

In one or more embodiments, native code module 118 is loaded into memory of computing system 102 for inspection by validator 112. Once loaded into memory, page table protection provided by the operating system of computing system 102 may prevent native code module 118 from being modified. As discussed below with respect to FIG. 2, page table protection may additionally provide SFI mechanisms for restricting instruction execution in native code module 118 to a code region in the address space and data accesses to the code region or a data region in the address space.

In one or more embodiments, validator 112 performs static binary analysis on native code module 118 to ensure that native code module 118 conforms to a set of security constraints. If native code module 118 does not conform to the security constraints, validator 112 may discard native code module 118 prior to loading native code module 118 into secure runtime environment 114.

During analysis of native code module 118, validator 112 may ensure that native code module 118 is statically linked at a start address of zero (e.g., providing a zero-based address range for native code module 118) with the first byte of text at 128 Kbytes after the start address. Validator 112 may then sequentially disassemble and/or decode all executable instructions within native code module 118, beginning with the first byte of text at 128 Kbytes after the start address. During disassembly, validator 112 may verify that native code module 118 does not contain any "unsafe" or otherwise restricted instructions, such as instructions that directly invoke the operating system, hardware performance instructions, and/or complex addressing modes. As discussed below, validator 112 may also verify that data blocks within a code region associated with native code module 118 begin with illegal instructions.

Once native code module 118 is validated, native code module 118 is executed in secure runtime environment 114. As described in the above-referenced applications, secure runtime environment 114 may load and launch native code module 118 from memory; provide an execution environment that includes communications, threads, memory management, and debugging support for native code module 118; moderate access to system resources according to an access policy for native code module 118; and/or support the isolated execution of multiple native code modules on computing system 102. Consequently, secure runtime environment 114 may provide additional SFI mechanisms for ensuring the secure execution of native code module 118 on computing system 102. In particular, secure runtime environment 114 may restrict access from native code module 118 to registers, memory, and/or other resources associated with the ARM ISA.

As discussed in the above-referenced applications, validator 112 and/or secure runtime environment 114 may enforce security for native code module 118 by providing pseudo-instructions that mask certain instructions within native code module 118. In one or more embodiments, pseudo-instructions are used to constrain both control flow instructions and store instructions within the ARM ISA. Furthermore, the SFI mechanisms provided by validator 112 and/or secure runtime environment 114 may ensure that all instructions within each pseudo-instruction are executed sequentially or not at all. Execution of pseudo-instructions within ARM ISAs is discussed in further detail below with respect to FIG. 3B.

In one or more embodiments, validator 112 and/or secure runtime environment 114 provide SFI mechanisms that enforce control flow integrity by restricting the execution of certain instructions, ensuring that data blocks are never executed, validating direct control flow instructions, and/or masking destination addresses associated with indirect control flow instructions. More specifically, validator 112 may ensure that control flow instructions in native code module 118 are restricted to branch-and-link (e.g., bl) instructions and branch-and-exchange (e.g., bx) instructions. In other words, validator 112 may disable program counter (e.g., R15 register) updates using general register move instructions or load multiple (e.g., ldm) instructions. Alternatively, as discussed below, program counter updates may be used to mask indirect control flow instructions. Furthermore, validator 112 and/or secure runtime environment 114 may disable the use of Thumb instructions in native code module 118. Such restrictions may simplify control flow analysis by validator 112 with little to no performance impact during execution of native code module 118.

In addition, validator 112 and/or secure runtime environment 114 may ensure that data blocks within the code region associated with native code module 118 are never executed. As mentioned previously, page table protection may restrict instruction execution in native code module 118 to a code region of the address space. However, the ARM ISA may store both executable instructions and data (e.g., constant pools) within the code region. To prevent data from being executed, the SFI mechanisms may divide the code region into equally sized, aligned 16-byte blocks containing either code (e.g., code blocks) or data (e.g., data blocks), start each data block in the code region with an illegal instruction, and ensure that each indirect control flow instruction targets the beginning of an aligned 16-byte code block. Data blocks within code regions are discussed below with respect to FIG. 3A. Code blocks within code regions are discussed below with respect to FIG. 3B.

To validate direct control flow instructions, validator 112 may statically compute direct control flow targets and confirm that the targets correspond to valid instructions. To validate indirect control flow instructions (e.g., instructions with targets computed at runtime), validator 112 may verify that each indirect control flow instruction is part of a multi-instruction sequence (e.g., pseudo-instruction) with appropriate address masking operations during loading of native code module 118 into memory.

In one or more embodiments, destination addresses associated with indirect control flow instructions are masked by clearing a set of upper bits and a set of lower bits in each of the destination addresses. In one or more embodiments, the code region begins at address 0 and continues to an address that is a power of 2 in the address space. As a result, an exemplary indirect control flow pseudo-instruction that masks a branch-and-exchange instruction involving the r3 register may include the following instructions:

BIC r3, r3, #0xf0000000f
bx r3

The first instruction of the pseudo-instruction may correspond to a masking (e.g., bit-clearing) instruction that clears the four highest and lowest bits in the r3 register. The masking instruction may ensure that the target of the branch-and-exchange instruction is aligned along a 16-byte alignment boundary and remains within a code region in the range of 0-256 megabytes in the address space. Alternatively, the indirect control flow pseudo-instruction above may be implemented using a single instruction:

BIC pc, r3, 0xf0000000f

In other words, the pseudo-instruction may directly update the program counter with the masked destination address instead of preceding a branch-and-link or branch-and-exchange instruction with a masking instruction.

Those skilled in the art will appreciate that the size and position of the code region may allow for a more efficient implementation of SFI than unaligned memory regions and/or memory regions of other sizes. More specifically, the creation of a code region between address 0 and a power of 2 within the address space may allow masking to be accomplished using a single instruction and a variety of instructions and operands. For example, the indirect control flow pseudo-instruction above may utilize any arithmetic or logical instruction(s) that clear the four highest and lowest bits in the r3 register. Similarly, the same masking instructions may be used with modified operands to accommodate code regions of different sizes, as long as the sizes are powers of 2.

Such instructions and/or operands may further be selected for use in pseudo-instructions to minimize performance overhead during execution of native code module 118. In particular, the use of a logical-and operation to mask addresses may introduce an overhead of about one instruction per masking operation if the size of the code region is a power of two. In other words, base-2 modular arithmetic may be used to efficiently implement masking in most 32-bit and 64-bit ISAs, while code regions of arbitrary sizes may preclude the use of base-2 modular arithmetic and require additional overhead in masking operations (e.g., from division operations). However, efficient implementations of non-base-2 arithmetic operations may allow masking operations to use such arithmetic operations. For example, an efficient implementation of base-10 modular arithmetic may allow the size of the code region to be a power of 10 and may introduce the use of base-10 arithmetic operations in masking operations.

Validator 112 and/or secure runtime environment 114 may additionally include SFI mechanisms for constraining load and/or store instructions in native code module 118. Such SFI mechanisms may include the verification of pseudo-instructions and/or specific addressing modes within native code module 118, as well as the use of unmapped pages to bound a valid memory region and/or call stack of native code module 118. Constraining of store instructions is discussed in further detail below with respect to FIG. 2.

Figure 2:
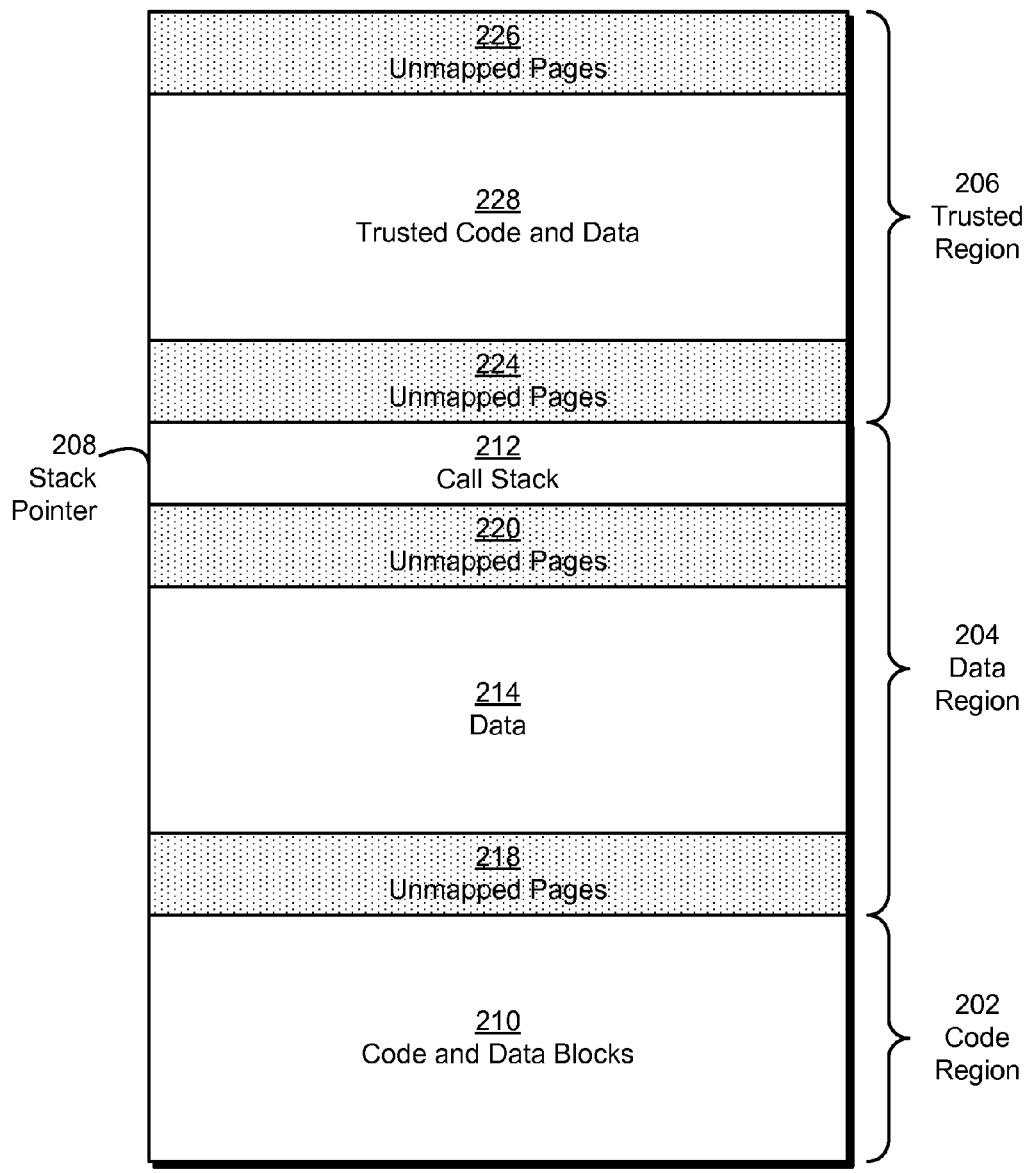
FIG. 2 shows an address space in accordance with an embodiment.

FIG. 2 shows an address space in accordance with an embodiment. The address space may correspond to a 32-bit address space of an ARM processor (e.g., ARM processor 122 of FIG. 1) into which a native code module (e.g., native code module 118 of FIG. 1) is loaded. As shown in FIG. 2, the address space includes a code region 202, a data region 204, and a trusted region 206.

In one or more embodiments, code region 202 begins at address 0 and extends to an address that is a power of two (e.g., the first 256 megabytes of the address space). Data region 204 begins where code region 202 ends and extends to an address that is a higher power of two (e.g., the first 2 Gbytes of the address space). Finally, trusted region 206 occupies the remainder of the address space (e.g., the last 2 Gbytes). Code region 202 may contain both code and data blocks 210, while data region 204 may contain a call stack 212, data 214, and a set of unmapped pages 218 and 220. Trusted region 206 may contain a different set of unmapped pages 224 and 226. Unmapped pages 224 and 226 may bound trusted code and data 228 used to facilitate the execution of the native code module, such as code and data for a validator (e.g., validator 112 of FIG. 1), secure runtime environment (e.g., secure runtime environment 114 of FIG. 1), and/or trusted services associated with the native code module.

As described in the above-referenced applications, trampoline instructions may be used by the native code module to access resources and/or services associated with trusted region 206. However, a number of SFI mechanisms associated with code region 202, data region 204, trusted region 206, and/or a stack pointer 208 within data region 204 may prevent the native code module from inappropriately accessing trusted region 206 and/or other portions of the address space. The SFI mechanisms may be provided by the validator and/or secure runtime environment and constrain both control flow instructions and stores within the native code module.

First, the SFI mechanisms may include page table protection in lieu of hardware memory segments provided by x86 ISAs. Page table protection may be provided by the ARM processor and/or an operating system associated with the address space and may restrict the native code module's access to various parts of the address space. First, page table protection may restrict access to code region 202 and data region 204. As described above, code region 202 may begin at address 0, with the first byte of text at 128 Kbytes. Moreover, after the native code module is loaded into code region 202, page table protection may prevent code region 202 from subsequent modification.

Page table protection may also prevent the native code module from executing portions of the address space outside of code region 202. For example, the use of execute-never (e.g., XN) bits in ARM page table entries may prevent the native code module from executing pages in data region 204. Bits in page table entries may also be set to restrict portions of data region 204 to read-only access and/or read-write access by the native code module. For example, string constants associated with the native code module may be stored in a read-only section of data region 204 that is enforced using page table protection. As discussed below, page table protection associated with unmapped pages 218, 220, 224, and 226 may effectively constrain the native code module's memory references and stack pointer 208 updates to code region 202 and/or data region 204 while minimizing performance overhead.

Next, the SFI mechanisms may enforce storage of valid data addresses (e.g., within data region 204) in stack pointer 208 (e.g., the R13 register) used to reference call stack 212. Stack pointer 208 may be initialized with an address within call stack 212. To constrain stack pointer 208 within call stack 212, the SFI mechanisms may bound call stack 212 with unmapped pages 220 and 224, enable store instructions that increment or decrement stack pointer 208 without masking, and/or mask direct updates to stack pointer 208 to keep a value of stack pointer 208 within call stack 212.

More specifically, unmapped pages 220 and 224 may enable stack-relative store instructions without masking if the immediate offset plus the largest store is smaller than a size of one or more of the unmapped pages (e.g., 4 Kbytes). As a result, store instructions (e.g., stm, ldm, etc.) that increment or decrement stack pointer 208 may be executed without masking. Because such instructions make relatively small adjustments to stack pointer 208, the adjustments either keep stack pointer 208 within call stack 212 or cause segmentation violations if stack pointer 208 exceeds the bounds of call stack 212 and references an instruction in an unmapped page 220 or 224. The SFI mechanisms may then respond to the segmentation violations by terminating the execution of the native code module and/or triggering traps that handle the segmentation violations.

In addition, direct updates to stack pointer 208 may be made using the add, sub, and/or mov instructions using immediate offsets, while instructions such as ldr and ldm may be disallowed in direct updates to stack pointer 208. Direct updates with offsets larger than the size of unmapped pages 220 and 224 may be followed immediately by a masking instruction that keeps stack pointer 208 within call stack 212 and/or unmapped pages 220 and 224. For example, a pseudo-instruction for a direct update to stack pointer 208 may correspond to the following:

sub sp, sp, #0xdc
bic sp, sp, 0x80000000

To constrain non-stack-relative store instructions, the SFI mechanisms may allow addressing modes that calculate store addresses by combining a valid base register with an immediate offset while disabling addressing modes that calculate store addresses by adding two registers together. Because immediate offsets may correspond to 12-bit numbers, addressing modes that use immediate offsets may cause displacements of at most 4 Kbytes. Consequently, immediate offsets of register values within the address range of code region 202 and/or data region 204 may remain either within code region 202 or data region 204 or generate illegal memory references into unmapped pages 218, 224, and 226 that cause segmentation violations.

Furthermore, non-stack-relative store instructions may be masked to ensure that register values used in the non-stack-relative store instructions fall within code region 202 or data region 204. For example, a store pseudo-instruction that executes a mask instruction prior to a non-stack-relative store instruction may include the following instructions:

bic fp, fp, #0x80000000
str r3, [fp, #−1248]

Those skilled in the art will also appreciate that the same SFI mechanisms described above may be used to constrain load instructions in the native code module. In particular, page table protection; unmapped pages 218, 220, 224, and 226; restrictions on modifications to stack pointer 208; masking; and/or register+immediate offset addressing modes may also be used to constrain load addresses to code region 202 or data region 204. For example, load addresses may be computed by combining a valid base register with an immediate offset and/or by masking values in the base register. As a result, the validator and/or secure runtime environment may also include functionality to constrain some or all load instructions in the native code module.

Furthermore, the validator and/or secure runtime environment may use a variety of SFI mechanisms to constrain any combination of non-stack-relative loads, non-stack-relative stores, stack-relative loads, and stack-relative stores. Such selective constraining of loads and/or stores may be based on security and/or performance considerations associated with executing the native code module. For example, stack pointer 208 may be restricted to code region 202 and data region 204 (e.g., the lower 2 Gbytes of the address space) instead of to call stack 212 to reduce the amount of masking used in stack-relative loads and/or stores.

Figure 3A:
FIG. 3A shows an exemplary data block in accordance with an embodiment.

FIG. 3A shows an exemplary data block in accordance with an embodiment. As discussed above, the data block may be located within a code region (e.g., code region 202 of FIG. 2) of a native code module (e.g., native code module 118 of FIG. 1). Furthermore, the data block may correspond to an aligned 16-byte block of memory that starts with an illegal instruction 302 (e.g., bkpt 0x7777) in the first four bytes (e.g., at an offset of e250) and contains data 304, 306, and 308 in the last 12 bytes (e.g., at offsets of e254, e258, and e25c).

In one or more embodiments, illegal instruction 302 corresponds to a breakpoint that prevents the data block from being executed. Because direct control flow instructions are validated to not target data blocks and indirect control flow instructions are masked to target the beginnings of aligned 16-byte blocks, data 304, 306, and 308 is effectively never targeted by any control flow instruction. Along the same lines, indirect control flow instructions that target illegal instruction 302 may cause an exception that discontinues execution of the native code module and prevents subsequent execution of data 304, 306, and 308. Consequently, the use of data blocks within the code region may enable conformity to the ARM compilation model while maintaining control flow integrity in the native code module.

Figure 3B:
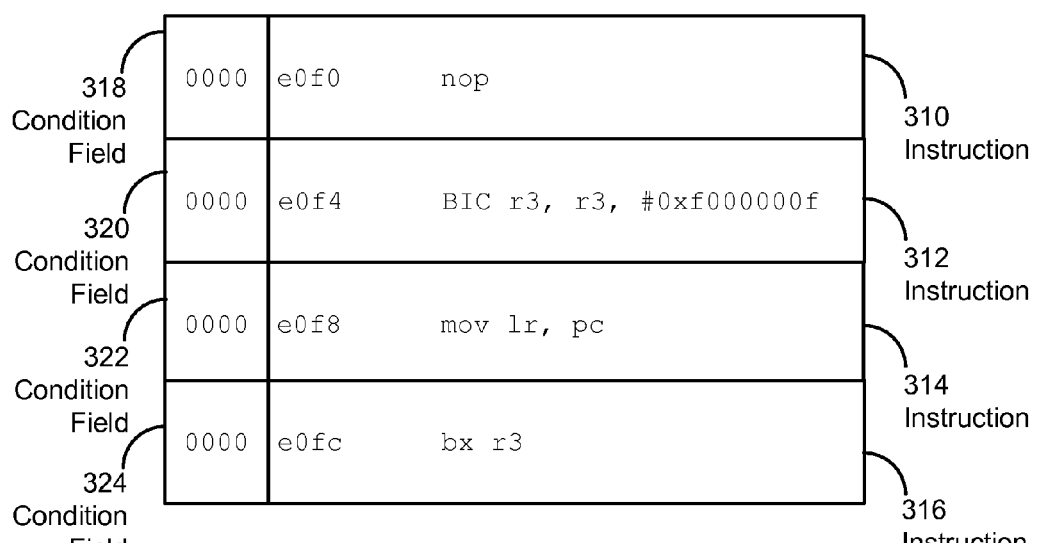
FIG. 3B shows an exemplary code block in accordance with an embodiment.

FIG. 3B shows an exemplary code block in accordance with an embodiment. In particular, FIG. 3B shows an aligned 16-byte code block containing an exemplary pseudo-instruction in accordance with an embodiment. The code block may be stored within a code region (e.g., code region 202 of FIG. 2) of the native code module. Moreover, the pseudo-instruction may be used to mask an instruction 316 (e.g., bx r3) in a native code module (e.g., native code module 118 of FIG. 1). As shown in FIG. 3B, the 16-byte code block is divided into four sections at offsets of e0f0, e0f4, e0f8, and e0fc, with each section containing a four-byte instruction 310, 312, 314, or 316.

In one or more embodiments, a number of SFI mechanisms may ensure that instructions 310, 312, 314, and 316 within the pseudo-instruction are executed from beginning to end. First, SFI mechanisms associated with control flow integrity may force control flow instructions to target the beginning of the code block. In addition, padding within the native code module may align instructions such that the pseudo-instruction takes up the entire 16-byte code block. For example, instruction 310 may correspond to a nop instruction that aligns the last instruction 316 of the pseudo-instruction with the end of the code block. In other words, nop instructions may be used to place indirect control flow instructions (e.g., instruction 316) in the last sections of aligned 16-byte code blocks, which may ensure that each code block contains at most one and only one pseudo-instruction. Consequently, control flow instructions targeting the code block of FIG. 3B and/or other code blocks containing pseudo-instructions may only reach the beginnings of the pseudo-instructions and may not bypass masking instructions within the pseudo-instructions.

Sequential execution of instructions 310-316 may further be facilitated by storing the same execution condition in condition fields 318, 320, 322, and 324 of instructions 310, 312, 314, and 316. Each condition field 318, 320, 322, and 324 may correspond to four bits in the corresponding instruction 310, 312, 314, and 316 that specifies the execution condition required to execute the instruction. In particular, the execution condition may be obtained from instruction 316 that is masked by other instructions 310, 312, and 314 in the pseudo-instruction. If the execution condition is met, instructions 310, 312, 314, and 316 are executed, and if the execution condition is not met, the pseudo-instruction is bypassed as a whole. In other words, instructions 310, 312, 314, and 316 may utilize predication such that instructions 310, 312, 314, and 316 within the pseudo-instruction are executed in an all-or-none fashion.

In one or more embodiments, the execution condition is based on a set of condition codes stored in a Current Program Status Register (CPSR) provided by the ARM ISA. More specifically, the condition codes may correspond to the Negative, Zero, Carry, and/or Overflow (e.g., N, Z, C, V) bits of the CPSR register. As shown in FIG. 3B, the execution condition in condition fields 318, 320, 322, and 324 is set as "0000," indicating that instruction 316 is intended to execute only if the Z bit of the CPSR register is set. Moreover, instructions 310, 312, and 314 may not change the condition codes. As a result, the condition codes and condition fields 318, 320, 322, and 324 in instructions 310, 312, 314, and 316 may further ensure that instructions within the pseudo-instruction are executed sequentially (e.g., if the condition codes satisfy the condition) or not at all (e.g., if the condition codes do not satisfy the condition).

Figure 4:
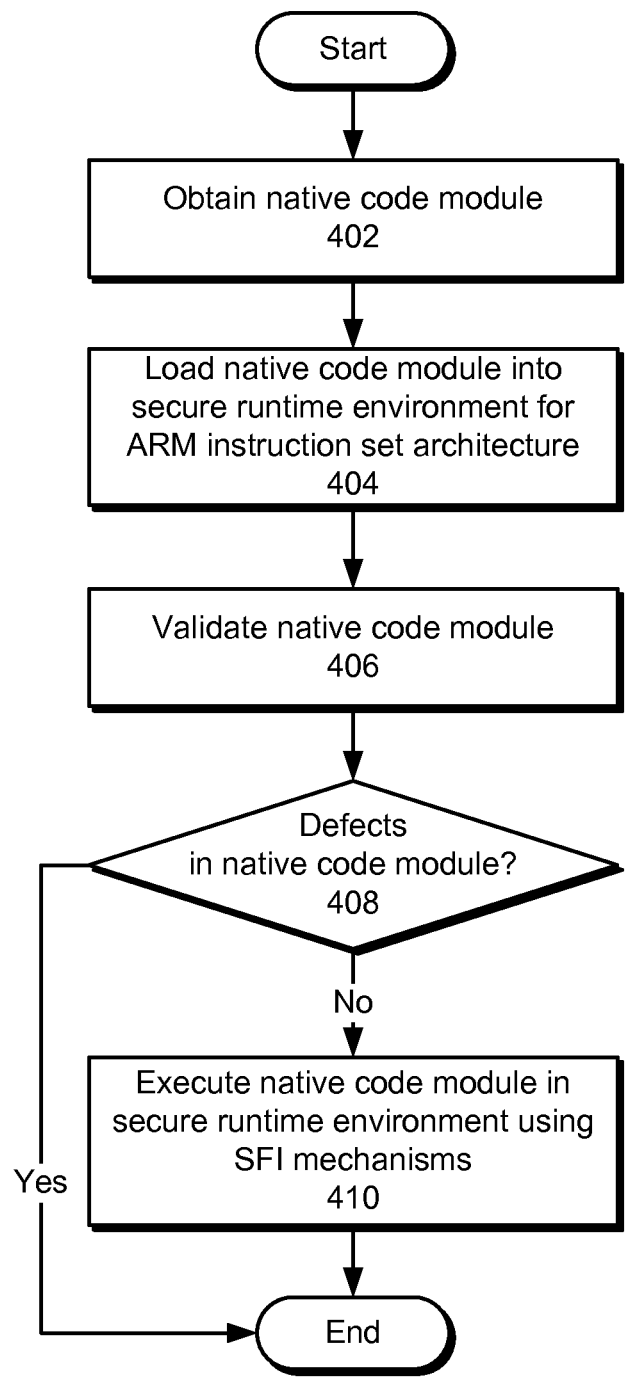
FIG. 4 shows a flowchart illustrating the process of executing a native code module in accordance with an embodiment.

FIG. 4 shows a flowchart illustrating the process of executing a native code module in accordance with an embodiment. In one or more embodiments, one or more of the steps may be omitted, repeated, and/or performed in a different order. Accordingly, the specific arrangement of steps shown in FIG. 4 should not be construed as limiting the scope of the technique.

First, the native code module is obtained (operation 402). The native code module may be obtained from one or more servers and/or compiled from source code. In addition, the native code module may be used to facilitate the execution of a web application, such as a JavaScript application. For example, the native code module may be used to perform computationally intensive operations for the web application.

Next, the native code module is loaded into a secure runtime environment for an ARM ISA (operation 404). In particular, the native code module may be loaded into a valid memory region (e.g., code region 202 and data region 204 of FIG. 2) in the 32-bit address space of the ARM ISA. The loaded native code module is then validated (operation 406) using one or more SFI mechanisms prior to executing the native code module. During validation, the native code module may be inspected for conformity to a set of security constraints. In particular, the native code module may be inspected to detect defects that do not conform to the security constraints (operation 408). If the native code module does not conform to the security constraints (e.g., the validator detects defects in the native code), the native code module is discarded without having been executed.

If the validator does not detect defects in the native code module, the native code module is executed in the secure runtime environment using the SFI mechanisms (operation 410). The secure runtime environment may be provided by a plugin associated with the web browser, a browser extension to the web browser, and/or a component within the web browser. The SFI mechanisms may maintain control flow integrity for the native code module and/or constrain store instructions in the native code module. To maintain control flow integrity, the SFI mechanisms may divide the code region into equally sized (e.g., aligned 16-byte) code blocks and data blocks, start data blocks in the code region with illegal instructions, restrict control flow instructions to branch-and-link instructions and branch-and-exchange instructions, validate direct control flow instructions, disable Thumb instructions, and/or mask destination addresses associated with indirect control flow instructions. Similarly, the SFI mechanisms may constrain store instructions by bounding an address space and a call stack of the native code module with a set of unmapped pages, enforcing storage of valid data addresses in a stack pointer, computing a store address by combining a valid base register with an immediate offset, and/or masking non-stack-relative store instructions.

Consequently, the SFI mechanisms used to validate and execute the native code module may enable secure execution of the native code module on ARM hardware with low performance overhead while maintaining portability and platform independence across different web browsers and operating systems. In particular, the SFI mechanisms may provide per-thread protection that constrains threads used to execute untrusted code in the native code module while allowing trusted code used to validate and execute the native code module to execute without constraints. Furthermore, the SFI mechanisms may improve performance by minimizing overhead associated with masking store instructions. Finally, the direct execution of the native code module on ARM hardware may allow the native code module to execute on a variety of ARM processors and operating systems without modification.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the present embodiments. The scope of the embodiments is defined by the appended claims.

What is claimed is:

1. A computer-implemented method for executing a native code module, comprising:
   obtaining the native code module;
   loading the native code module into a secure runtime environment; and
   safely executing the native code module in the secure runtime environment using a set of software fault isolation (SFI) mechanisms by:
      constraining store instructions in the native code module; and
      maintaining control flow integrity for the native code module by:
         dividing a code region associated with the native code module into blocks of equal size, wherein each of a first plurality of the blocks in the code region is a respective code block and each of a second plurality of the blocks in the code region is a respective data block; and
         starting each data block in the code region with a respective illegal instruction.

2. The computer-implemented method of claim 1, wherein the secure runtime environment is for an Advanced Reduced Instruction Set Computing (RISC) Machine (ARM) instruction set architecture.

3. The computer-implemented method of claim 1, further comprising:
   validating the native code module using one or more of the SFI mechanisms prior to executing the native code module in the secure runtime environment.

4. The computer-implemented method of claim 3, wherein maintaining control flow integrity for the native code module further involves at least one of:
   restricting control flow instructions to branch-and-link instructions and branch-and-exchange instructions;
   validating direct control flow instructions;
   disabling Thumb instructions; and
   masking destination addresses associated with indirect control flow instructions.

5. The computer-implemented method of claim 4, wherein masking destination addresses associated with indirect control flow instructions involves:
   clearing a set of upper bits and a set of lower bits in each of the destination addresses.

6. The computer-implemented method of claim 4, wherein a transfer of control flow to the illegal instruction causes the native code module to discontinue execution.

7. The computer-implemented method of claim 3, wherein constraining store instructions in the native code module involves:
- bounding an address space and a call stack of the native code module with a set of unmapped pages;
- enforcing storage of valid data addresses in a stack pointer;
- computing a store address by combining a valid base register with an immediate offset; and
- masking non-stack-relative store instructions.

8. The computer-implemented method of claim 7, wherein enforcing storage of valid data addresses in the stack pointer involves:
- enabling store instructions that increment or decrement the stack pointer without masking; and
- masking direct updates to the stack pointer to keep a value of the stack pointer within the call stack.

9. The computer-implemented method of claim 7, wherein the unmapped pages enable stack-relative store instructions without masking if the immediate offset is smaller than a size of one or more of the unmapped pages.

10. The computer-implemented method of claim 1, wherein the SFI mechanisms are configured to mask instructions in the native code module by:
- executing a mask instruction prior to executing each instruction from the instructions; and
- storing an execution condition of the instruction in a condition code field of the mask instruction.

11. A system for executing a native code module, comprising:
- a web browser configured to obtain the native code module; and
- a secure runtime environment associated with the web browser, wherein the secure runtime environment is configured to safely execute the native code module using a set of software fault isolation (SFI) mechanisms by:
  - constraining store instructions in the native code module; and
  - maintaining control flow integrity for the native code module by:
    - dividing a code region associated with the native code module into blocks of equal size, wherein each of a first plurality of the blocks in the code region is a respective code block and each of a second plurality of the blocks in the code region is a respective data block; and
    - starting each data block in the code region with a respective illegal instruction.

12. The system of claim 11, wherein the secure runtime environment is for an Advanced Reduced Instruction Set Computing (RISC) Machine (ARM) instruction set architecture.

13. The system of claim 11, further comprising:
- a validator configured to validate the native code module using one or more of the SFI mechanisms prior to executing the native code module.

14. The system of claim 13, wherein maintaining control flow integrity for the native code module further involves at least one of:
- restricting control flow instructions to branch-and-link instructions and branch-and-exchange instructions;
- validating direct control flow instructions;
- disabling Thumb instructions; and
- masking destination addresses associated with indirect control flow instructions.

15. The system of claim 14, wherein masking destination addresses associated with indirect control flow instructions involves:
- clearing a set of upper bits and a set of lower bits in each of the destination addresses.

16. The system of claim 13, wherein constraining store instructions in the native code module involves:
- bounding an address space and a call stack of the native code module with a set of unmapped pages;
- enforcing storage of valid data addresses in a stack pointer;
- computing a store address by combining a valid base register with an immediate offset; and
- masking non-stack-relative store instructions.

17. The system of claim 16, wherein enforcing storage of valid data addresses in the stack pointer involves:
- enabling store instructions that increment or decrement the stack pointer without masking; and
- masking direct updates to the stack pointer to keep a value of the stack pointer within the call stack.

18. The system of claim 11, wherein the SFI mechanisms are configured to mask instructions in the native code module by:
- executing a mask instruction prior to executing each instruction from the instructions; and
- storing an execution condition of the instruction in a condition code field of the mask instruction.

19. A non-transitory computer-readable storage medium storing instructions that when executed by a computer cause the computer to perform a method for executing a native code module, the method comprising:
- obtaining the native code module;
- validating the native code module using a set of software fault isolation (SFI) mechanisms;
- loading the native code module into a secure runtime environment; and
- safely executing the native code module in the secure runtime environment using one or more of the SFI mechanisms by:
  - constraining store instructions in the native code module; and
  - maintaining control flow integrity for the native code module by:
    - dividing a code region associated with the native code module into blocks of equal size, wherein each of a first plurality of the blocks in the code region is a respective code block and each of a second plurality of the blocks in the code region is a respective data block; and
    - starting each data block in the code region with a respective illegal instruction.

20. The computer-readable storage medium of claim 19, wherein the secure runtime environment is for an Advanced Reduced Instruction Set Computing (RISC) Machine (ARM) instruction set architecture.

21. The computer-readable storage medium of claim 19, wherein maintaining control flow integrity for the native code module involves at least one of:
- restricting control flow instructions to branch-and-link instructions and branch-and-exchange instructions;
- validating direct control flow instructions;
- disabling Thumb instructions; and
- masking destination addresses associated with indirect control flow instructions.

22. The computer-readable storage medium of claim 21, wherein masking destination addresses associated with indirect control flow instructions involves:

clearing a set of upper bits and a set of lower bits in each of the destination addresses.

23. The computer-readable storage medium of claim 19, wherein constraining store instructions in the native code module involves:
bounding an address space and a call stack of the native code module with a set of unmapped pages;
enforcing storage of valid data addresses in a stack pointer;
computing a store address by combining a valid base register with an immediate offset; and
masking non-stack-relative store instructions.

24. The computer-readable storage medium of claim 23, wherein enforcing storage of valid data addresses in the stack pointer involves:
enabling store instructions that increment or decrement the stack pointer without masking; and
masking direct updates to the stack pointer to keep a value of the stack pointer within the call stack.

25. The computer-readable storage medium of claim 23, wherein the SFI mechanisms are configured to mask instructions in the native code module by:
executing a mask instruction prior to executing each instruction from the instructions; and
storing an execution condition of the instruction in a condition code field of the mask instruction.

* * * * *